(12) United States Patent
Dragojlov et al.

(10) Patent No.: US 12,359,734 B2
(45) Date of Patent: Jul. 15, 2025

(54) ROTOR FOR MULTIPORT COOLANT FLOW CONTROL VALVE ASSEMBLY

(71) Applicant: Vitesco Technologies USA, LLC, Auburn Hills, MI (US)

(72) Inventors: Alexander Dragojlov, Chatham (CA); Ravinder Singh Gill, Chatham (CA); Bogdan-Daniel Rautu, Dumbravita (RO)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 49 days.

(21) Appl. No.: 17/822,276

(22) Filed: Aug. 25, 2022

(65) Prior Publication Data
US 2024/0068578 A1   Feb. 29, 2024

(51) Int. Cl.
*F16K 11/065*   (2006.01)
*F16K 11/085*   (2006.01)

(52) U.S. Cl.
CPC .......... *F16K 11/065* (2013.01); *F16K 11/085* (2013.01)

(58) Field of Classification Search
CPC .............................. F16K 11/065; F16K 11/085
See application file for complete search history.

(56) References Cited

U.S. PATENT DOCUMENTS

| | | | |
|---|---|---|---|
| 668,833 A | 2/1901 | Gilbert | |
| 1,422,178 A * | 7/1922 | Cooley | F16K 11/0853 251/297 |
| 1,556,804 A * | 10/1925 | Parks | F16K 11/0853 137/625.29 |
| 2,127,679 A * | 8/1938 | Clifford | F15B 13/04 137/625.23 |
| 2,604,904 A * | 7/1952 | Robert | B64D 15/166 137/625.23 |
| 2,996,083 A * | 8/1961 | Huska | F16K 11/085 137/625.11 |
| 3,499,467 A | 3/1970 | Mccord | |
| 3,630,231 A | 12/1971 | Miller | |
| 3,927,693 A | 12/1975 | Johnston | |
| 4,108,207 A | 8/1978 | Doody | |

(Continued)

FOREIGN PATENT DOCUMENTS

| | | |
|---|---|---|
| CN | 2093285 U | 1/1992 |
| CN | 2198478 Y | 5/1995 |

(Continued)

*Primary Examiner* — Craig M Schneider
*Assistant Examiner* — Christopher D Ballman

(57) ABSTRACT

A multi-port valve assembly, including a housing, a plurality of ports formed as part of the housing, and a rotor disposed in the housing, the rotor selectively in fluid communication with the ports. A first channel is integrally formed as part of the rotor, and a circumferential wall is part of the first channel, the circumferential wall at least partially surrounding a circular aperture which is also part of the first channel. The multi-port valve assembly also includes a second channel integrally formed as part of the rotor, the second channel fluidically isolated from the first channel, and at least two flow paths formed by the orientation of the rotor relative to the housing and the ports. The rotor is placed in one of a plurality of configurations relative to the ports and the housing such that each of the plurality of configurations includes the flow paths.

16 Claims, 9 Drawing Sheets

(56) References Cited

U.S. PATENT DOCUMENTS

| | | | |
|---|---|---|---|
| 5,967,185 A | 10/1999 | Baruschke et al. | |
| 6,000,430 A * | 12/1999 | Nafz | F16K 11/0876 |
| | | | 137/625.11 |
| 6,245,233 B1 * | 6/2001 | Lu | B01D 24/12 |
| | | | 210/425 |
| 6,295,828 B1 | 10/2001 | Koo | |
| 6,539,899 B1 | 4/2003 | Piccirilli et al. | |
| 6,983,760 B2 * | 1/2006 | Lee | F15B 13/0435 |
| | | | 251/59 |
| 7,293,660 B2 * | 11/2007 | Lin | F16K 11/085 |
| | | | 210/429 |
| 8,740,186 B2 | 6/2014 | Lauridsen | |
| 9,212,751 B2 | 12/2015 | McLane et al. | |
| 9,381,921 B2 | 7/2016 | Roudeau et al. | |
| 9,382,833 B2 | 7/2016 | Morein | |
| 9,383,032 B1 | 7/2016 | Bhatasana | |
| 9,404,594 B2 | 8/2016 | Morein | |
| 9,500,299 B2 | 11/2016 | Morein et al. | |
| 9,669,207 B2 * | 6/2017 | Ueda | F16K 11/085 |
| 9,958,082 B2 | 5/2018 | Yu et al. | |
| 10,323,756 B2 * | 6/2019 | Wan | F16K 5/181 |
| 10,344,877 B2 | 7/2019 | Roche et al. | |
| 10,458,562 B2 | 10/2019 | Ozeki et al. | |
| 10,544,725 B2 | 1/2020 | Schaefer | |
| 10,690,040 B2 | 6/2020 | Jang et al. | |
| 10,704,453 B2 | 7/2020 | Park et al. | |
| 10,808,856 B2 | 10/2020 | Shen et al. | |
| 10,927,972 B2 | 2/2021 | Murakami | |
| 10,968,809 B2 | 4/2021 | Yoshimura et al. | |
| 10,968,810 B2 | 4/2021 | Zhou et al. | |
| 10,975,974 B2 * | 4/2021 | Zhu | F16K 11/0853 |
| 11,255,450 B2 * | 2/2022 | Ledvora | F16K 5/0471 |
| 11,280,414 B2 * | 3/2022 | Graichen | F16K 11/0876 |
| 11,448,116 B2 * | 9/2022 | Geißel | F16K 11/0853 |
| 11,655,906 B2 * | 5/2023 | Ledvora | F16K 11/0856 |
| | | | 137/625.23 |
| 11,773,990 B2 * | 10/2023 | Koch | F16K 11/0853 |
| | | | 137/1 |
| 2004/0221901 A1 * | 11/2004 | Chen | F16K 11/0853 |
| | | | 137/625.23 |
| 2006/0237359 A1 * | 10/2006 | Lin | F16K 11/085 |
| | | | 210/438 |
| 2010/0319796 A1 | 12/2010 | Whitaker | |
| 2015/0354716 A1 | 12/2015 | Morein | |
| 2017/0152957 A1 | 6/2017 | Roche et al. | |
| 2018/0080664 A1 | 3/2018 | Arrus | |
| 2018/0292016 A1 | 10/2018 | Ledvora et al. | |
| 2019/0136724 A1 | 5/2019 | Wong | |
| 2021/0381607 A1 * | 12/2021 | Koch | F16K 11/0853 |
| 2022/0090700 A1 * | 3/2022 | Hamada | B60H 1/00485 |

FOREIGN PATENT DOCUMENTS

| | | |
|---|---|---|
| CN | 201502748 U | 6/2010 |
| CN | 201944338 U | 8/2011 |
| CN | 204729668 U | 10/2015 |
| CN | 105408671 A | 3/2016 |
| CN | 205401824 U | 7/2016 |
| CN | 107690543 A1 | 2/2018 |
| CN | 107917246 A1 | 4/2018 |
| CN | 108692066 A | 10/2018 |
| DE | 19707534 A1 | 5/1998 |
| EP | 0048680 A1 | 3/1982 |
| EP | 290514 A1 | 11/1988 |
| EP | 1448877 A1 | 8/2004 |
| EP | 3385583 A1 | 10/2018 |
| FR | 2988459 A1 | 9/2013 |
| JP | H246039 A1 | 2/1990 |
| JP | H828725 A1 | 2/1996 |
| WO | 2003046342 A1 | 6/2003 |
| WO | 20142014052571 A1 | 4/2014 |
| WO | 2015004497 A1 | 1/2015 |

* cited by examiner

ROTOR FOR MULTIPORT COOLANT FLOW CONTROL VALVE ASSEMBLY

FIELD OF THE INVENTION

The invention relates generally to a rotor for multi-port coolant flow control valve assembly which includes at least two flow paths when the rotor is placed in each of a plurality of configurations, where the rotor includes at least two channels which are shaped to minimize the pressure drop through the valve.

BACKGROUND OF THE INVENTION

Multi-port valves for directing fluid through various conduits are generally known. Some of the more common types of valves are a three-port valve, a four-port valve, or possibly a five-port valve, where a single valve member is used to direct fluid from an inlet port to one of several outlet ports. These current designs have limitations with regard to a pressure drop across the valve, which results in limitations for flow path design and efficiency. Some valves also have a limited configuration with regard to the amount of ports and flow channels, or have high restrictions in the flow path, which leads to increased pressure drop. The greater the pressure drop, the lower the efficiency. Furthermore, in order to achieve a desired pressure drop, current designs also have limitations regarding the size and shape of the rotor, and orientation of the rotor.

Accordingly, there exists a need for a multi-port valve assembly having a rotor which reduces the pressure drop, increasing efficiency, while also achieving the desired flow paths.

SUMMARY OF THE INVENTION

In an embodiment, the present invention is a coolant flow control valve (CFCV) which includes an actuator which is used to rotate a rotor to one or more positions, and thus direct coolant (passing through the rotor) between ports. The rotor is rotated to different positions to create various flow paths, such that coolant fluid is directed between the different ports. This includes channels which minimize the pressure drop, while maintaining sealing capabilities, which also maintains efficiency.

For a thermal management system, reducing the pressure drop of a valve has a direct impact on energy consumption. The CFCV having the rotor of the present invention results in a lower pressure drop, such that the pump expends less energy moving fluid through the CFCV. Having a lower pressure drop, or higher flow rate, also helps to achieve the desired cooling and heating functions of various elements in the thermal management system at a faster rate (e.g., higher coolant flow rate facilitates an increased charging speed of a battery in an electric vehicle). The rotor also allows for the sealing function to be maintained, which directly relates to power consumption. The lower the internal leak, the less power is needed to condition the leaked fluid in the wrong coolant loop to the correct temperature.

In an embodiment, the present invention is a multi-port valve assembly, including a housing, a plurality of ports, each of the plurality of ports formed as part of the housing, and a rotor disposed in the housing, the rotor selectively in fluid communication with the plurality of ports. In an embodiment, a first channel is integrally formed as part of the rotor, and a circumferential wall is part of the first channel, the circumferential wall at least partially surrounding a circular aperture which is also part of the first channel. A first side wall is part of the first channel and integrally formed with the circumferential wall, and a second side wall is part of the first channel and integrally formed with the circumferential wall, the first side wall being part of the first channel and the second side wall being part of the first channel forming a tapered portion, where the tapered portion is perpendicular to the central aperture. In an embodiment, the present invention also includes a second channel integrally formed as part of the rotor, the second channel fluidically isolated from the first channel, and at least two flow paths formed by the orientation of the rotor relative to the housing and the plurality of ports. The rotor is placed in one of a plurality of configurations relative to the ports and the housing such that each of the plurality of configurations includes the at least two flow paths.

In an embodiment, the first side wall which is part of the first channel and the second side which is part of the first channel and are located at an angle relative to one another which is less than 90°.

In an embodiment, the first side wall which is part of the first channel and the second side which is part of the first channel are tangential to the circumferential wall.

In an embodiment, the present invention includes a first side wall which is part of the second channel, and a second side wall which is part of the second channel. The first sidewall which is part of the second channel and the second sidewall which is part of the second channel are located at an angle relative to one another which is greater than 180°.

In an embodiment, the first side wall which is part of the second channel and the second side wall which is part of the second channel are integrally formed with the circumferential wall.

In an embodiment, a first angled wall is integrally formed with the circumferential wall and the first side wall which is integrally formed as part of the second channel, and a second angled wall is integrally formed with the circumferential wall and the second angled wall which is integrally formed as part of the second channel. In an embodiment, the first angled wall and the second angled wall are parallel to one another.

In an embodiment, present invention includes a first arcuate exterior wall integrally formed with the first side wall being part of the first channel and the first side wall being part of the second channel, and the first arcuate exterior wall is adjacent to the first channel and the second channel. In an embodiment, the present invention also includes a second arcuate exterior wall integrally formed with the second side wall being part of the first channel and the second side wall being part of the second channel, and the second arcuate exterior wall adjacent to the first channel and the second channel. Both the first arcuate exterior wall and the second arcuate exterior wall have a circumferential length that is greater than the inner diameter of each of the plurality of ports.

In an embodiment, during at least one of the plurality of configurations, fluid flows between two of the plurality of ports through the first channel, and fluid flows between another two of the plurality of ports through the second channel.

In an embodiment, the present invention includes a dispersion configuration where fluid flows into the second channel from a first of the plurality of ports, and into a second of the plurality of ports and a third of the plurality of ports.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
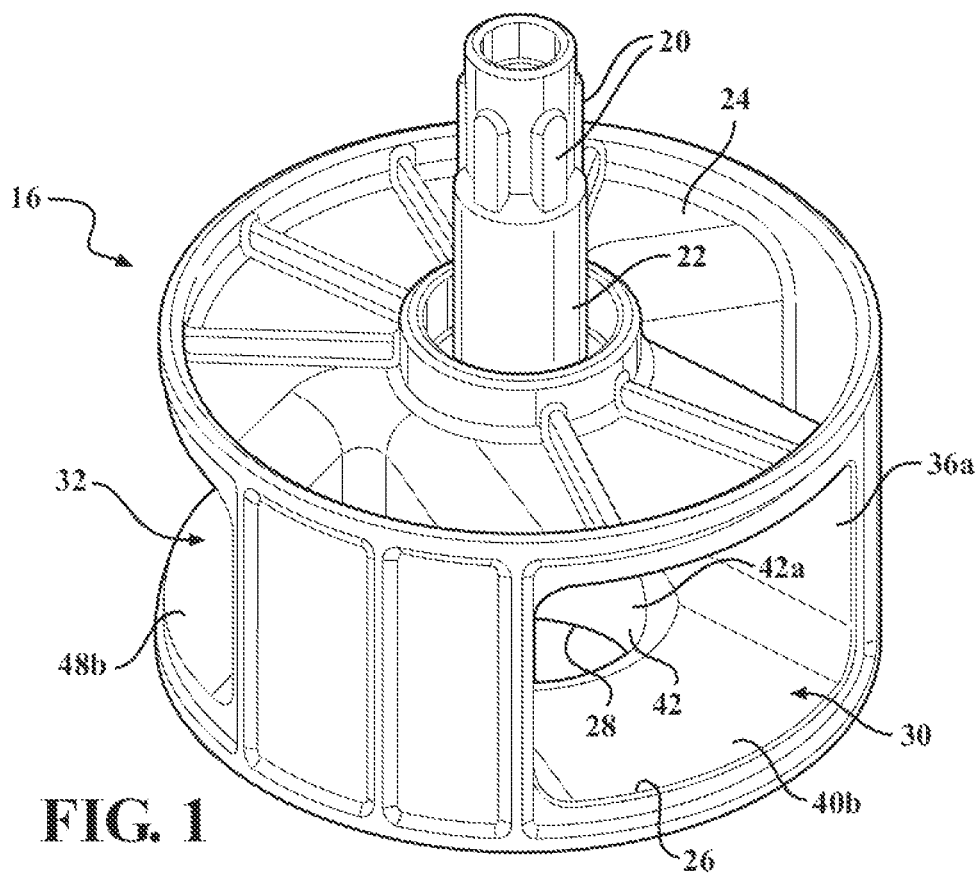
FIG. 1 is a first perspective view of a rotor which is part of a coolant flow control valve, according to embodiments of the present invention.
Figure 2:
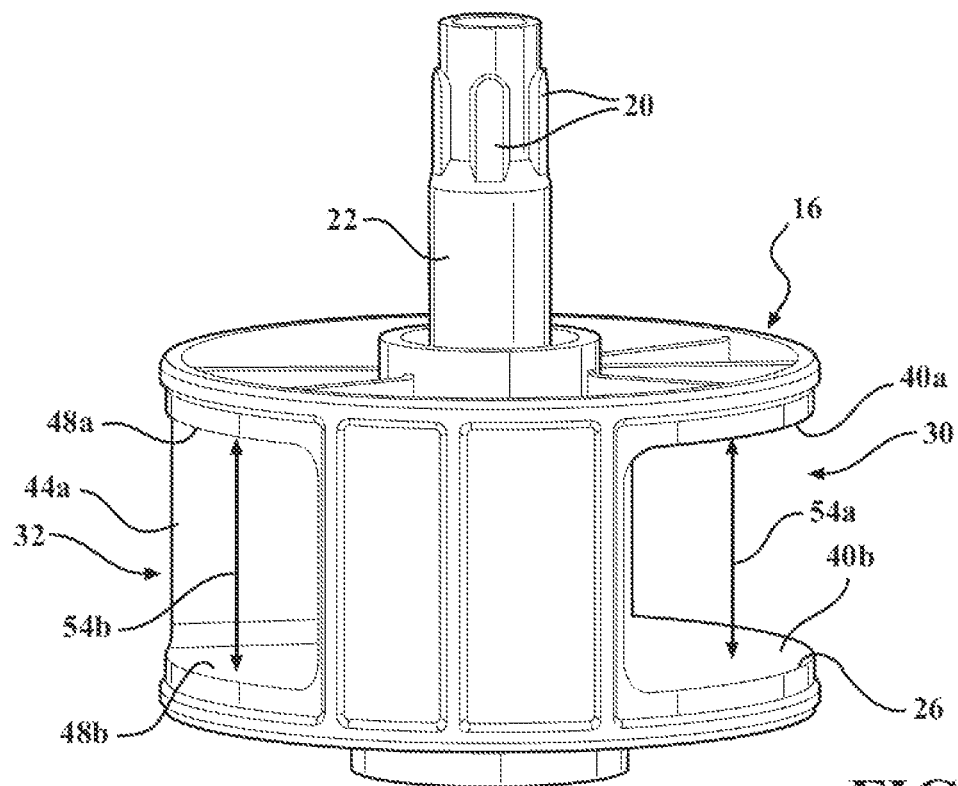
FIG. 2 is a second perspective view of a rotor which is part of a coolant flow control valve, according to embodiments of the present invention.
Figure 3:
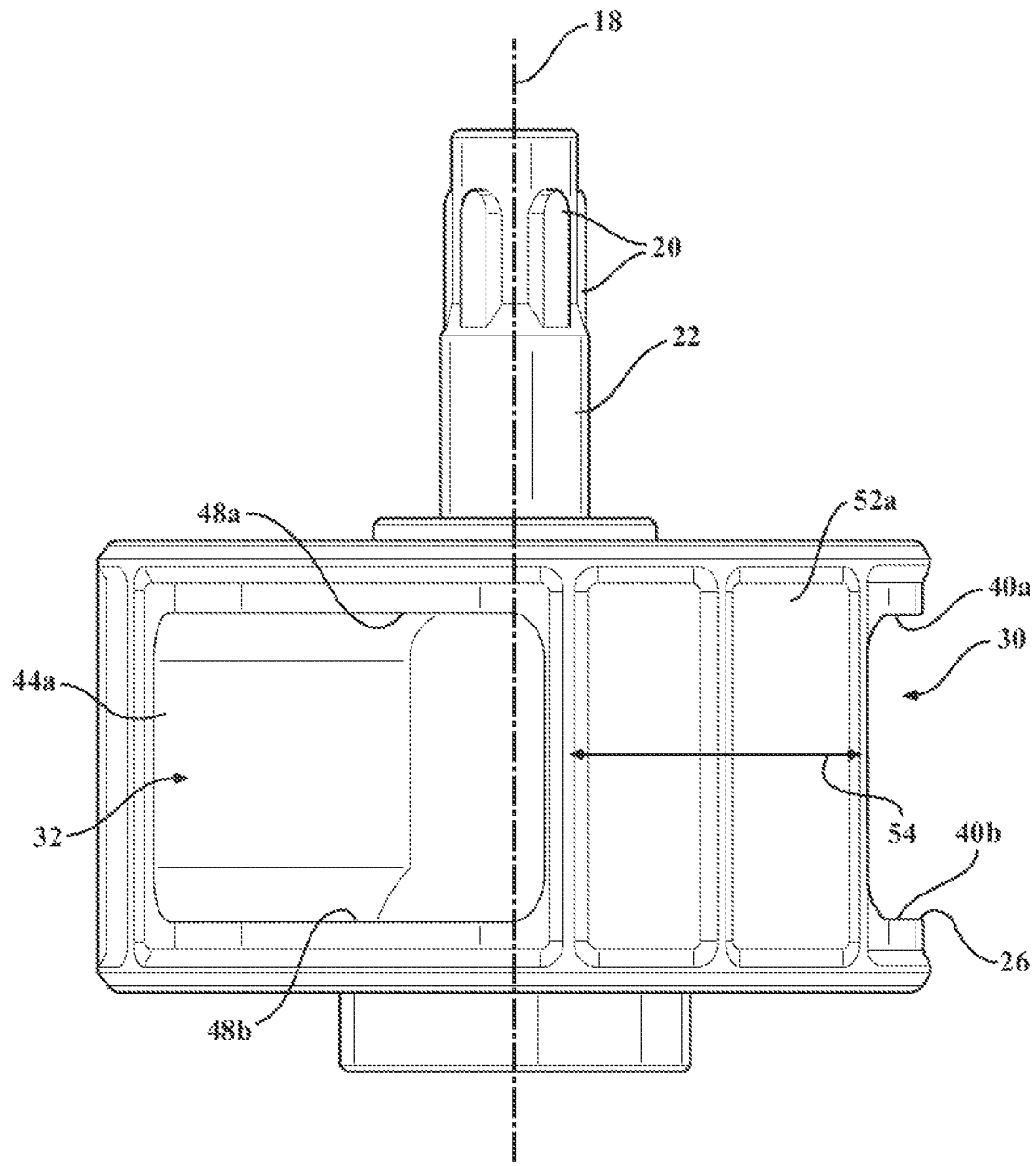
FIG. 3 is a side view of a rotor which is part of a coolant flow control valve, according to embodiments of the present invention.

The following description of the preferred embodiment(s) is merely exemplary in nature and is in no way intended to limit the invention, its application, or uses.

A first embodiment of a coolant flow control valve assembly having a rotor according to the present invention in shown in FIGS. 1-9B generally at 10. Referring to FIGS. 1-4A, the valve assembly 10 includes a housing 12, and inside the housing 12 is a cavity, shown generally at 14. Located in the cavity 14 is a valve member, which in this embodiment is a rotor, shown generally at 16. The rotor 16 is generally cylindrical in shape. The rotor 16 is able to rotate about an axis 18, and includes external gear teeth 20, formed as part of an extension 22. The extension 22 is integrally formed with a body portion 24, and the body portion 24 has a plurality of channels which provide multiple flow paths through the rotor 16. In this embodiment, the rotor 16 includes a first aperture 26 in fluid communication with a second aperture 28 through a first channel, shown generally at 30. Also integrally formed as part of the rotor 16 is a second channel, shown generally at 32, which in this embodiment is a side channel. The first channel 30 and the second channel 32 are fluidically isolated from one another such that the first channel 30 and the second channel 32 are not in fluid communication with one another. The housing 12 includes several ports. More specifically, there is a first port 34a, a second port 34b, a third port 34c, a fourth port 34d, and a fifth port 34e. In an embodiment, the rotor 16 is rotated in the housing 12 about the axis 18 by an actuator, where the actuator drives a gear train, and the gear train includes a gear member in mesh with the external gear teeth 20. However, it is within the scope of the invention that the rotor 16 may be rotated using other devices.

Figure 4A:
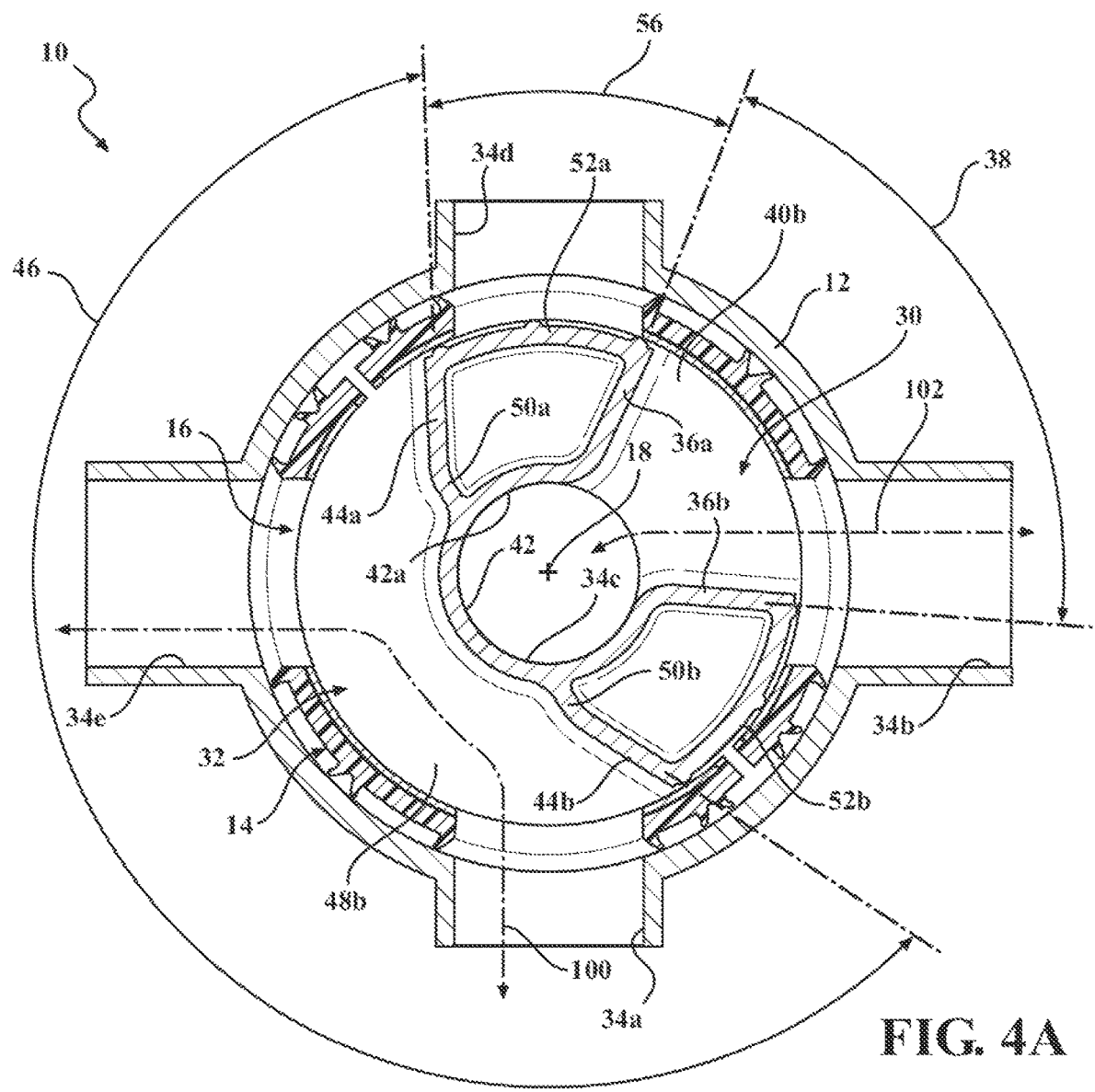
FIG. 4A is a top sectional view of a coolant flow control valve assembly having a rotor in a first configuration, according to embodiments of the present invention.
Figure 4B:
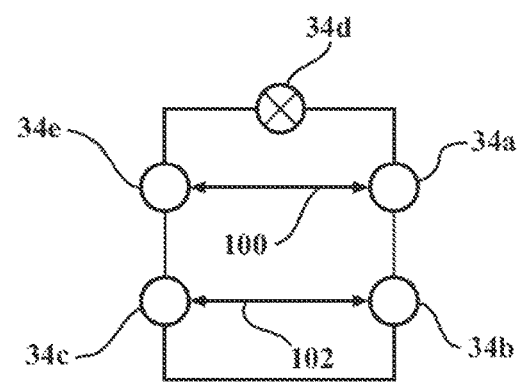
FIG. 4B is a diagram of the flow paths of a coolant flow control valve assembly having a rotor in a first configuration, according to embodiments of the present invention.

In FIGS. 4A-4B, the valve assembly 10 is placed in a first configuration, where the first port 34a is in fluid communication with the fifth port 34e through the second channel 32 to create a first flow path 100, such that there is flow between the first port 34a and the fifth port 34e. The second port 34b is in fluid communication with the third port 34c through the first channel 30 to create a second flow path 102 such that there is flow between the second port 34b and the third port 34c. In the first configuration, there is no flow through the fourth port 34d.

Figure 5A:
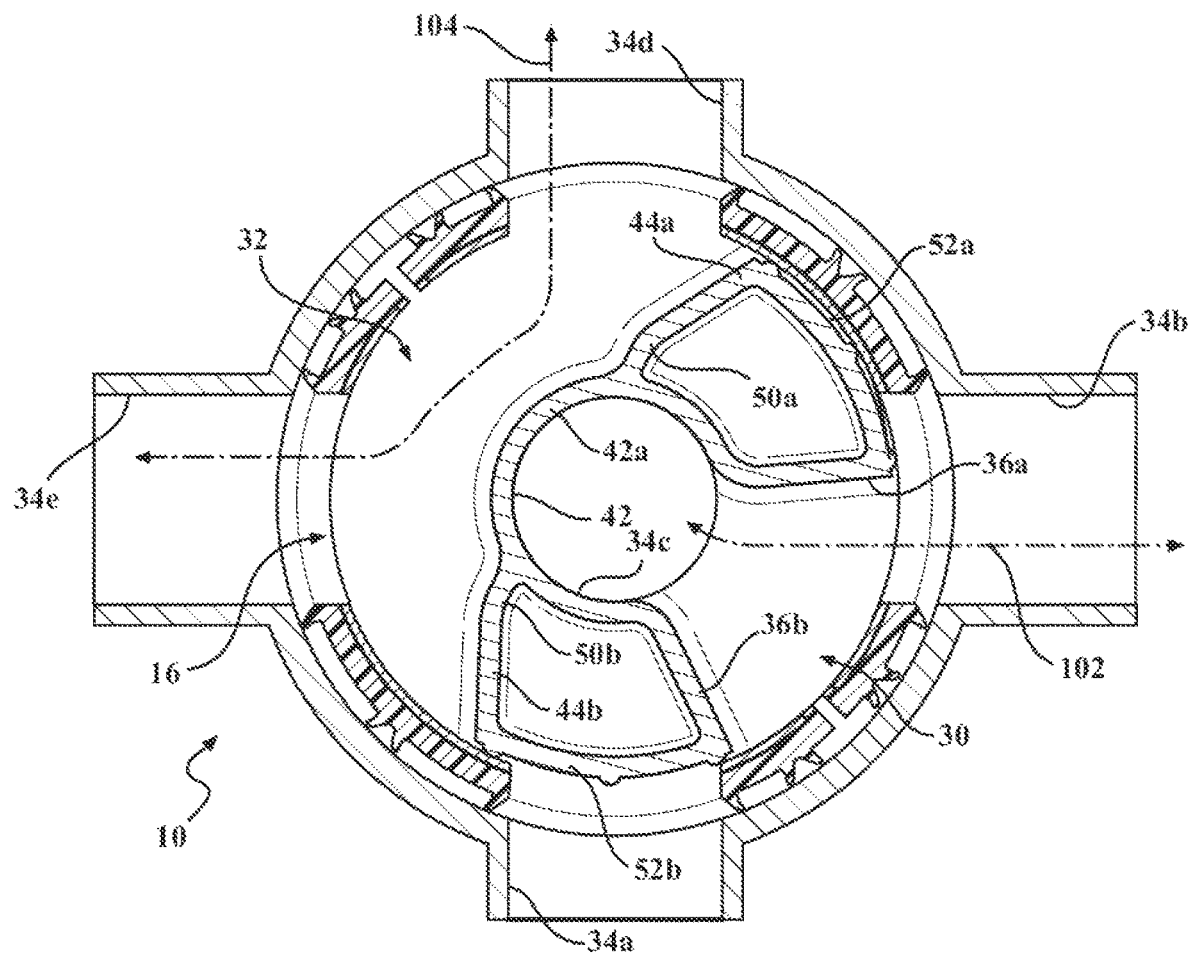
FIG. 5A is a top sectional view of a coolant flow control valve assembly having a rotor in a second configuration, according to embodiments of the present invention.
Figure 5B:
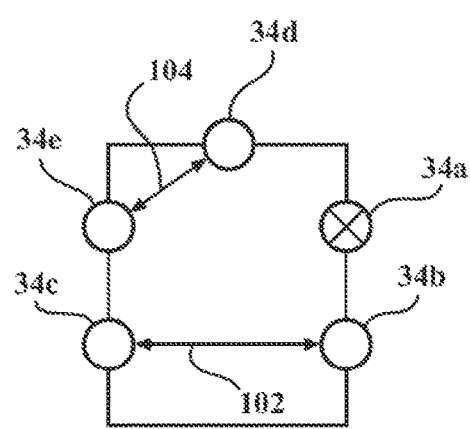
FIG. 5B is a diagram of the flow paths of a coolant flow control valve assembly having a rotor in a second configuration, according to embodiments of the present invention.

In FIGS. 5A-5B, the valve assembly 10 is placed in a second configuration, where the second port 34b is still in fluid communication with the third port 34c through the first channel 30, such that there is still flow through the second flow path 102. The fourth port 34d is in fluid communication with the fifth port 34e through the second channel 32 to create a third flow path 104, such that there is flow between the fourth port 34d and the fifth port 34e. In the second configuration, there is no flow through the first port 34A.

Figure 6A:
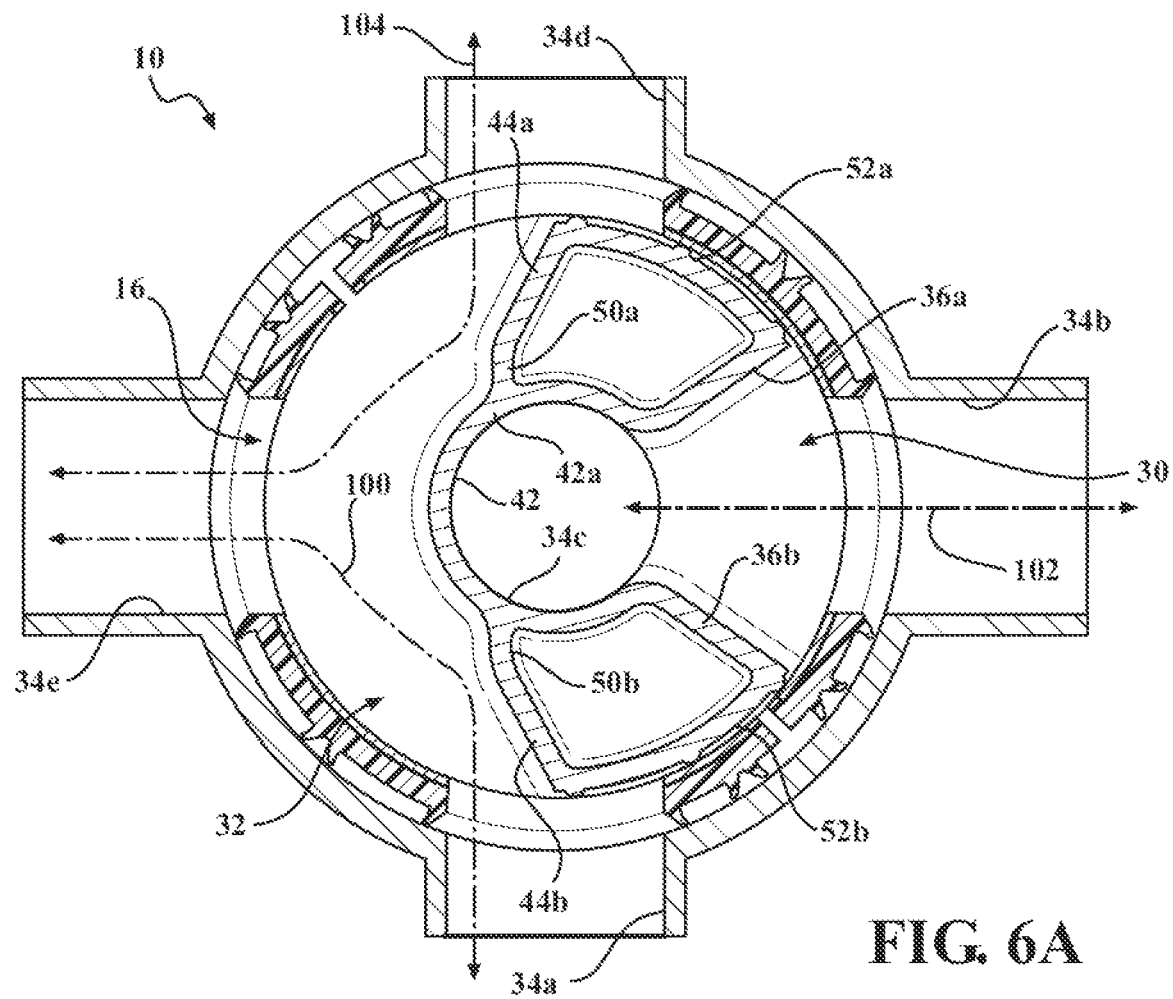
FIG. 6A is a top sectional view of a coolant flow control valve assembly having a rotor in a third configuration, according to embodiments of the present invention.
Figure 6B:
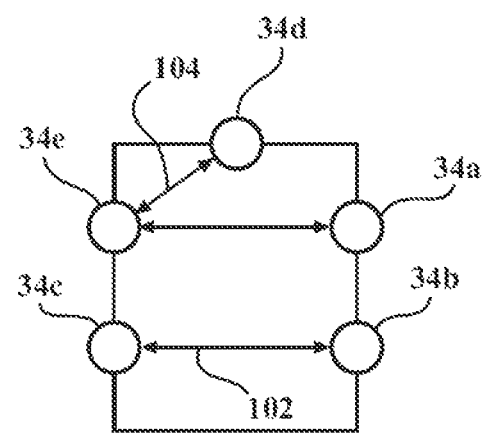
FIG. 6B is a diagram of the flow paths of a coolant flow control valve assembly having a rotor in a third configuration, according to embodiments of the present invention.

The valve assembly 10 is able to be placed in a third configuration, or first dispersion configuration, shown in FIGS. 6A-6B. The first dispersion configuration includes the first flow path 100, the second flow path 102, and the third flow path 104. In the third configuration, flow is dispersed from the fifth port 34e to both the first port 34a and the fourth port 34d. It should also be noted that the direction of flow for each of the flow paths 100, 104 could be reversed, such that the third configuration could be a collection, or convergence, configuration, where flow is collected from the first port 34a and the fourth port 34d into the fifth port 34e.

Figure 7A:
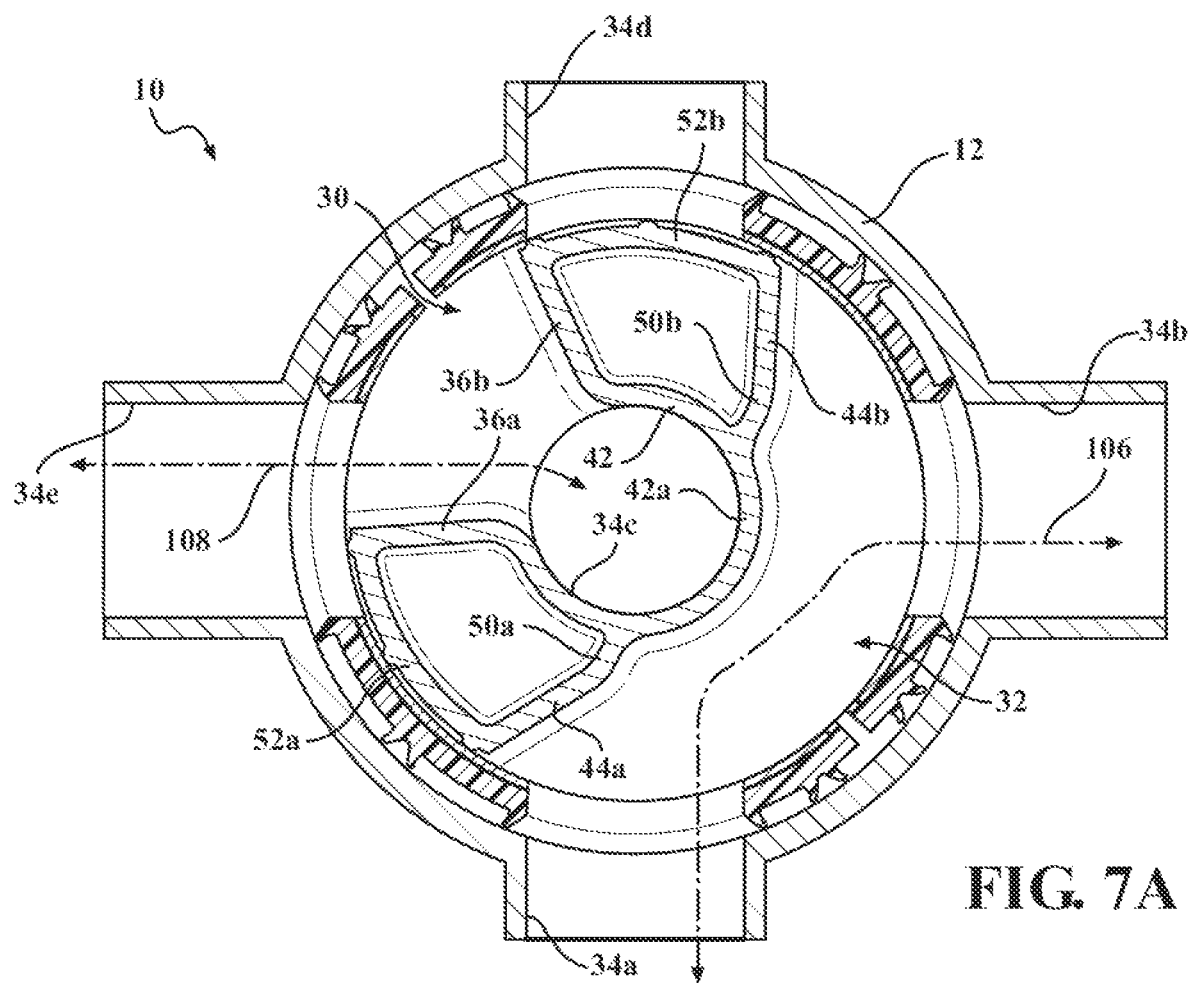
FIG. 7A is a top sectional view of a coolant flow control valve assembly having a rotor in a fourth configuration, according to embodiments of the present invention.
Figure 7B:
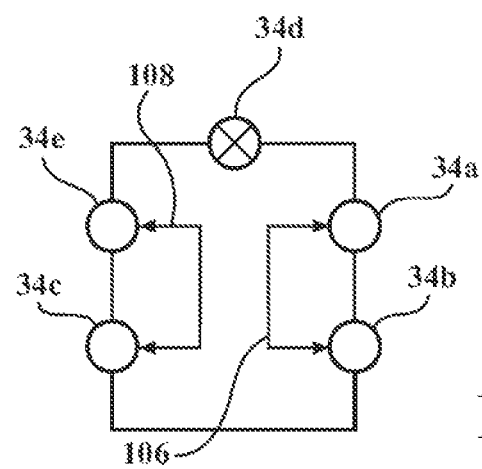
FIG. 7B is a diagram of the flow paths of a coolant flow control valve assembly having a rotor in a fourth configuration, according to embodiments of the present invention.

In FIGS. 7A-7B, the valve assembly 10 is placed in a fourth configuration, where the first port 34a is in fluid communication with the second port 34b through the second channel 32 creating a fourth flow path 106 such that there is flow between the second port 34b and the first port 34a. The fifth port 34e is in fluid communication with the third port 34c through the first channel 30 to create a fifth flow path 108 such that there is flow between the fifth port 34e and the third port 34c. In the fourth configuration, there is no flow through the fourth port 34d.

Figure 8A:
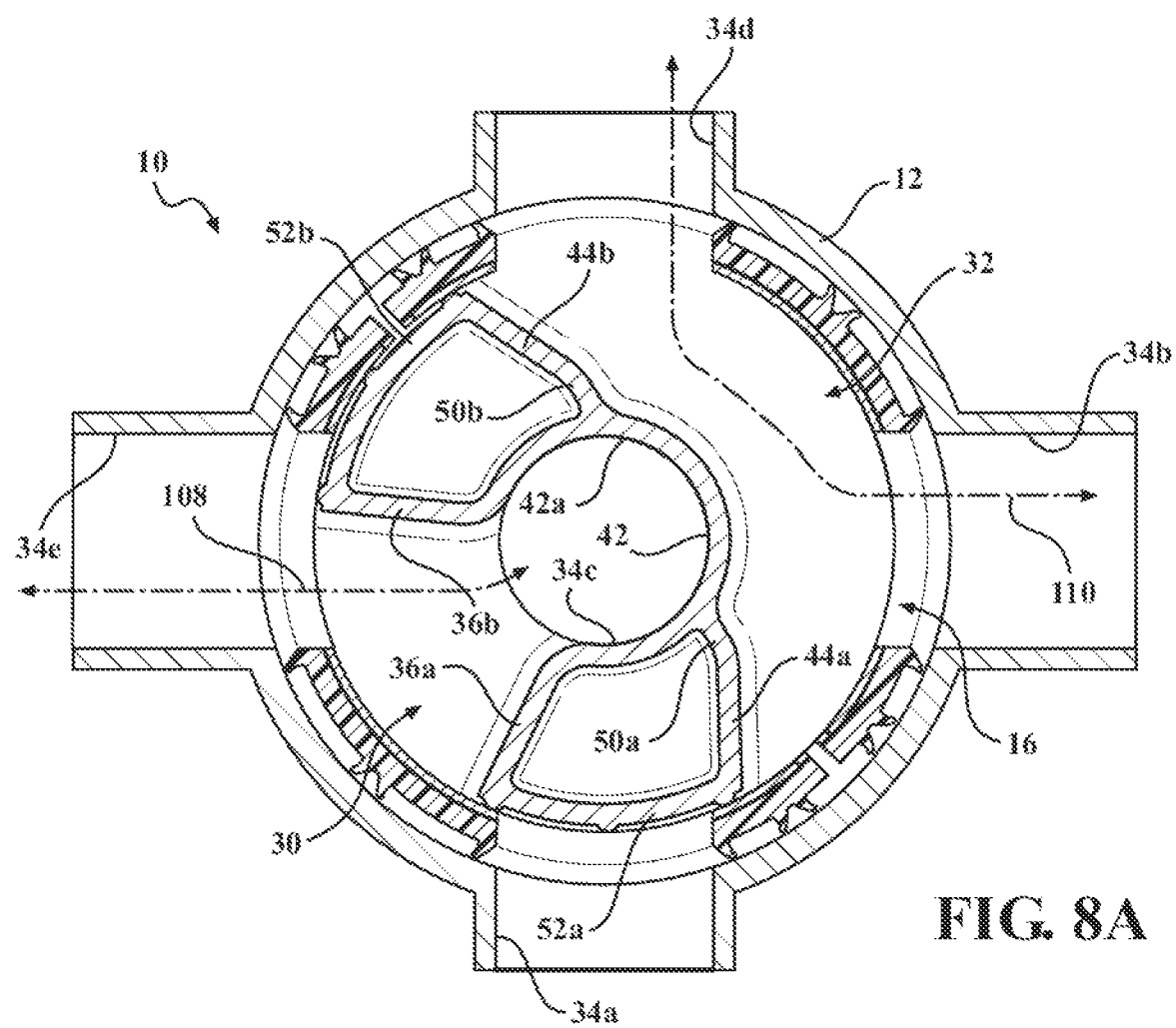
FIG. 8A is a top sectional view of a coolant flow control valve assembly having a rotor in a fifth configuration, according to embodiments of the present invention.
Figure 8B:
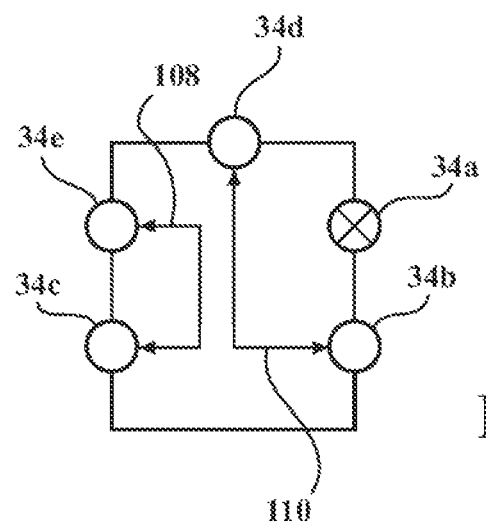
FIG. 8B is a diagram of the flow paths of a coolant flow control valve assembly having a rotor in a fifth configuration, according to embodiments of the present invention.

In FIGS. 8A-8B, the valve assembly 10 is placed in a fifth configuration, where the second port 34b is in fluid communication with the fourth port 34d through the second channel 32 creating the sixth flow path 110 such that there is flow between the second port 34b and the fourth port 34d. The fifth port 34e is still in fluid communication with the third port 34c through the first channel 30 such that there is still flow through the fifth flow path 108. In the fifth configuration, there is no flow through the first port 34a.

Figure 9A:
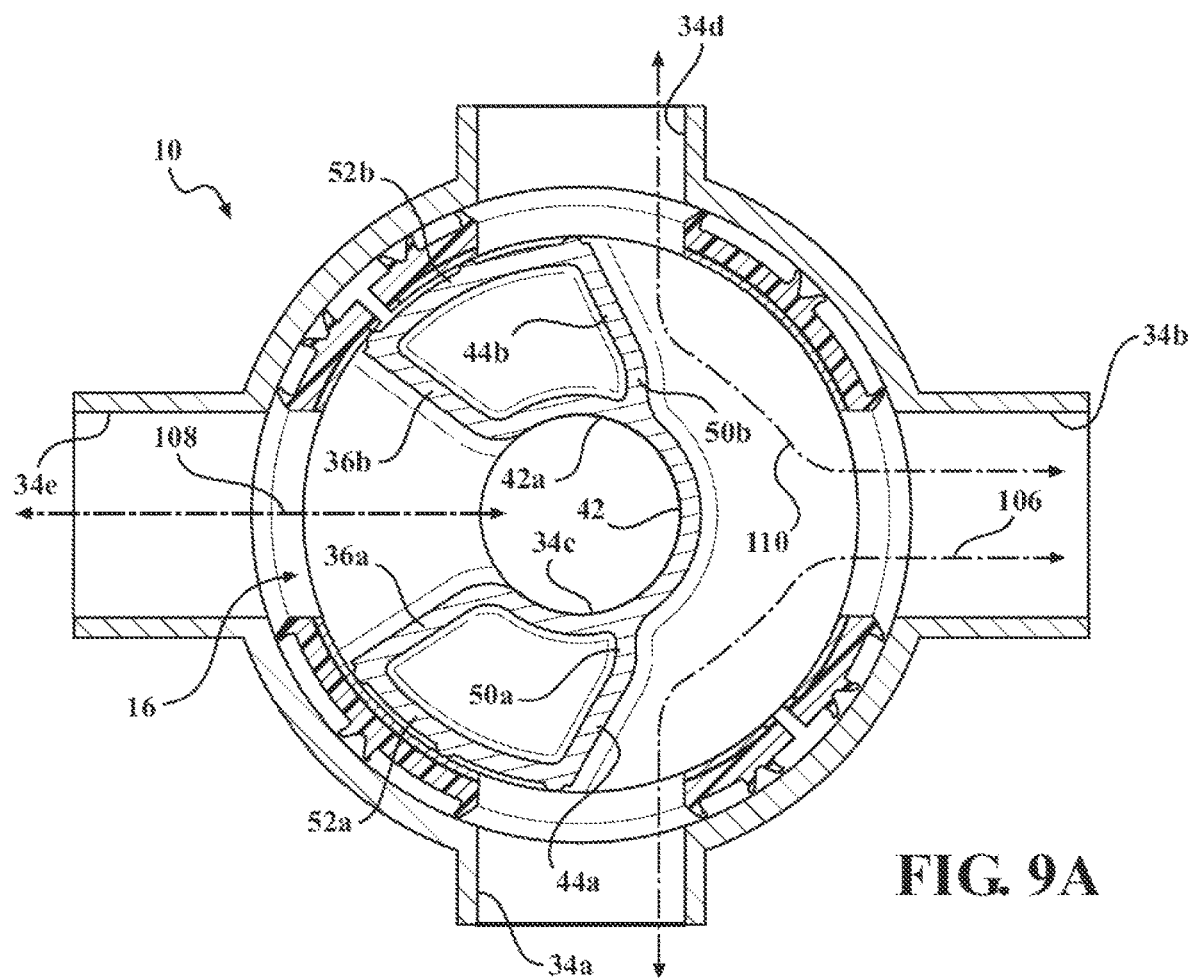
FIG. 9A is a top sectional view of a coolant flow control valve assembly having a rotor in a sixth configuration, according to embodiments of the present invention.
Figure 9B:
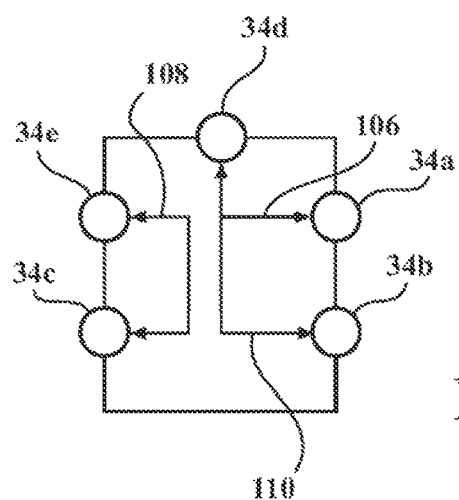
FIG. 9B is a diagram of the flow paths of a coolant flow control valve assembly having a rotor in a sixth configuration, according to embodiments of the present invention.

The valve assembly 10 is able to be placed in a sixth configuration, or second dispersion configuration, shown in FIGS. 9A-9B. The second dispersion configuration includes the fourth flow path 106, the fifth flow path 108, and the sixth flow path 110. In this configuration, flow is dispersed from the second port 34b to both the first port 34a and the fourth port 34d. It should also be noted that the direction of flow for each of the flow paths 106, 110 could be reversed, such that the sixth configuration could be a collection, or convergence, configuration, where flow is collected from the first port 34a and the fourth port 34d into the second port 34b.

The shape of the channels 30,32 and the cylindrical shape of the rotor 16 also achieve a desired minimized pressure drop during operation. In an embodiment, the cylindrical shape of the rotor 16 facilitates a flow area between the channels 30,32 and each of the ports 34a,34b,34d,34e to achieve a desired pressure drop. Referring now to FIG. 1-4A, the first channel 30 includes a first sidewall 36a and a second sidewall 36b which are located at an angle 38 relative to one another which in this embodiment is less than 90°. The vertex of the angle 38 intersects the axis 18. However, it is within the scope of the invention that the rotor 16 may be shaped differently such that the vertex of the angle 38 does not intersect the axis 18, and/or the angle 38 between the first sidewall 36a and the second sidewall 36b may be different to suit any particular application. The first channel 30 also includes a first outer wall 40a and a second outer wall 40b. The first outer wall 40a extends between and is integrally formed with the first side wall 36a and the second side wall 36b, and the second outer wall 40b also extends between and is integrally formed with the first side wall 36a and the second side wall 36b. The sidewalls 36a,36b and outer walls 40a,40b form a tapered portion of the first channel 30. The first channel 30 includes a circular aperture 42 which is in this embodiment is perpendicular relative to and is in fluid communication with the tapered portion. Therefore, at least of portion of the flow through the first channel 30 is also perpendicular. The center of the circular aperture 42 is also substantially aligned with the axis 18. The circular aperture 42 includes a partial circumferential wall 42a which does not completely circumscribe the circular aperture 42, but rather circumscribes the circular aperture 42 in an area of the circular aperture 42 which is not in fluid communication with the tapered portion. The circumferential wall 42a is integrally formed with the sidewalls 36a,36b. The center of the circular aperture 42 is in substantial alignment with the axis 18, and the circular aperture 42 is in continuous fluid communication with third port 34c.

The second channel 32 has a first sidewall 44a and a second sidewall 44b which are located at an angle 46 relative to one another which is greater than 180°. However, it is within the scope of the invention that the rotor 16 may be shaped differently such that the angle 46 between first sidewall 44a and the second sidewall 44b may be different to suit any particular application. The second channel 32 also includes a first outer wall 48a and a second outer wall 48b, and in an embodiment, the distance 54a between the first outer wall 40a and the second outer wall 40b of the first channel 30 is approximately the same as the distance 54b between the first outer wall 48a and a second outer wall 48b of the second channel 32. The first outer wall 48a extends between and is integrally formed with the first side wall 44a and the second side wall 44b, and the second outer wall 48b also extends between and is integrally formed with the first side wall 44a and the second side wall 44b. The first side wall 44a includes a first angled wall 50a, and the second sidewall includes a second angled wall 50b. The first angled wall 50a and the second angled wall 50b are integrally formed with the circumferential wall 42a, and the angled walls 50a,50b are located at an angle of 180° relative to one another, and are parallel to one another. Both angled walls 50a,50b also extend between and are integrally formed with the first side wall 44a and the second side wall 44b.

Also formed as part of the rotor 16 is a first arcuate exterior wall 52a and a second arcuate exterior wall 52b. The first sidewall 36a of the first channel 30 and the first sidewall 44a of the second channel 32 are integrally formed with the first arcuate exterior wall 52a, and the second sidewall 36b of the first channel 30 and the second sidewall 44b of the second channel 32 are integrally formed with the second arcuate exterior wall 52b. Each of the arcuate exterior walls 52a,52b has a circumferential length 56 which is larger than the inner diameter of each of the ports 34a,34b,34c,34d.

Figure 10:
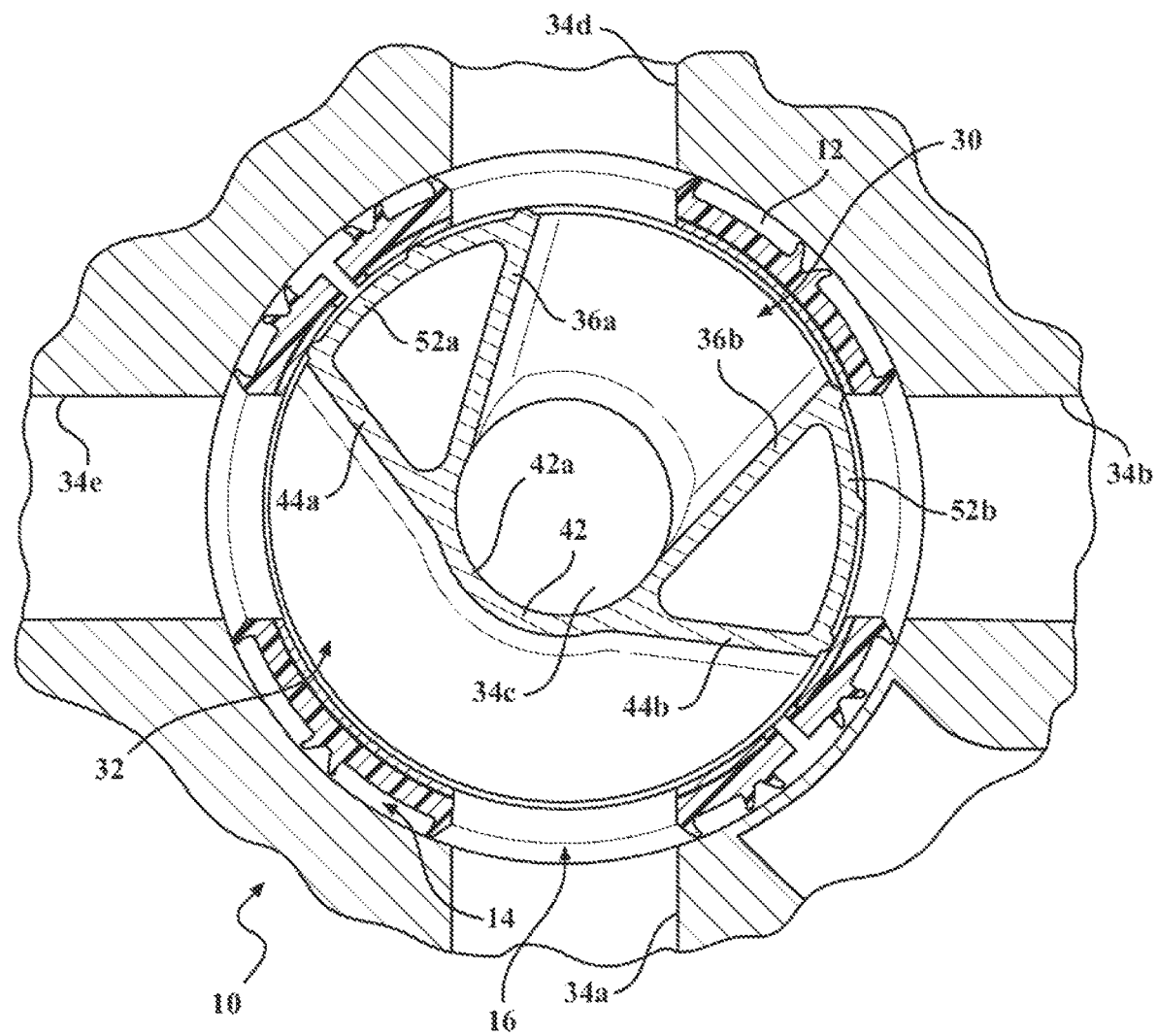
FIG. 10 is a top sectional view of a coolant flow control valve assembly having an alternate embodiment of a rotor, according to embodiments of the present invention.

Another embodiment of the present invention is shown in FIGS. 10, with like numbers referring to like elements. In this embodiment, the sidewalls 36a,36b of the first channel 30 are tangential to the circumferential aperture 42, and therefore are also tangential to the circumferential wall 42a. Also, each of the sidewalls 44a,44b extend from an outer circumference of the rotor 16 to the circumferential wall 42a. Also, in this embodiment, there is no angled walls 50a,50b, but rather the sidewalls 44a,44b are integrally formed with the circumferential wall 42a.

It should be noted that in all embodiments described above, it is within the scope of the invention that the dimensions of the channels 30,32 of the rotor 16 may be changed, and the position of the rotor 16 in each of the configurations may be changed to vary the alignment between the channels 30,32 and the ports 34a,34b,34d,34e, achieving a desired pressure drop.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. An apparatus, comprising:
a multi-port valve assembly, including:
 a housing;
 a plurality of ports, each of the plurality of ports formed as part of the housing;
 a rotor disposed in the housing, the rotor selectively in fluid communication with the plurality of ports;
 a first channel integrally formed as part of the rotor, the first channel further comprising:
  a first side wall;
  a second side wall, the first side wall of the first channel and the second side wall of the first channel are located at an angle (38) relative to one another which is less than 90°;

a circumferential wall being part of the first channel, the circumferential wall at least partially surrounding a circular aperture which is part of the first channel;
a second channel integrally formed as part of the rotor, the second channel fluidically isolated from the first channel, the second channel further comprising:
a first side wall;
a first angled wall integrally formed with the first side wall of the second channel and the circumferential wall;
a second side wall, the first side wall of the second channel and the second side wall of the second channel are located at an angle relative to one another which is greater than 180°;
a second angled wall integrally formed with the second side wall of the second channel and the circumferential wall;
a first arcuate exterior wall integrally formed as part of the rotor such that the first arcuate exterior wall is integrally formed with the first side wall of the second channel, the first angled wall is disposed between the first side wall of the second channel and the circumferential wall in the radial direction, and the first arcuate exterior wall is adjacent to the first channel and the second channel;
a second arcuate exterior wall integrally formed as part of the rotor such that the second arcuate exterior wall is integrally formed with the second side wall of the second channel, the second angled wall is disposed between the second side wall of the second channel and the circumferential wall in the radial direction, and the second arcuate exterior wall is adjacent to the first channel and the second channel;
at least two flow paths formed by the orientation of the rotor relative to the housing and the plurality of ports;
wherein the rotor is placed in one of a plurality of configurations relative to the ports and the housing such that each of the plurality of configurations includes the at least two flow paths.

2. The apparatus of claim 1, the first channel further comprising a tapered portion having an angle that is less than 90°.

3. The apparatus of claim 2, the tapered portion further comprising:
a first side wall integrally formed with the circumferential wall; and
a second side wall integrally formed with the circumferential wall;
wherein the first side wall of the tapered portion and the second side wall of the tapered portion are located at the angle relative to one another.

4. The apparatus of claim 3, wherein the first side wall of the tapered portion and the second sidewall of the tapered portion are tangential to the circular aperture.

5. The apparatus of claim 1, wherein the first angled wall and the second angled wall are parallel to one another.

6. The apparatus of claim 1, wherein both the first arcuate exterior wall and the second arcuate exterior wall have a circumferential length that is greater than the inner diameter of each of the plurality of ports.

7. The apparatus of claim 1, wherein during at least one of the plurality of configurations, fluid flows between two of the plurality of ports through the first channel, and fluid flows between another two of the plurality of ports through the second channel.

8. The multi-port valve assembly of claim 1, further comprising a dispersion configuration where fluid flows into the second channel from a first of the plurality of ports, and into a second of the plurality of ports and a third of the plurality of ports.

9. A multi-port valve assembly, including:
a housing;
a plurality of ports, each of the plurality of ports formed as part of the housing;
a rotor disposed in the housing, the rotor selectively in fluid communication with the plurality of ports;
a first channel integrally formed as part of the rotor, the first channel further comprising:
a first side wall;
a second side wall, the first side wall of the first channel and the second side wall of the first channel are located at an angle relative to one another which is less than 90°;
a circumferential wall being part of the first channel, the circumferential wall at least partially surrounding a circular aperture which is part of the first channel;
a first side wall being part of the first channel and integrally formed with the circumferential wall;
a second side wall being part of the first channel and integrally formed with the circumferential wall, the first side wall being part of the first channel and the second side wall being part of the first channel forming a tapered portion, the tapered portion being perpendicular to the central aperture;
a second channel integrally formed as part of the rotor, the second channel fluidically isolated from the first channel, the second channel further comprising:
a first side wall being part of the second channel;
a first angled wall integrally formed with the first side wall of the second channel and the circumferential wall;
a second side wall being part of the second channel, the first side wall being part of the second channel and the second side wall being part of the second channel are located at an angle relative to one another which is greater than 180°;
a second angled wall integrally formed with the second side wall of the second channel and the circumferential wall;
a first arcuate exterior wall integrally formed with the first side wall being part of the first channel and the first side wall being part of the second channel, and the first angled wall is disposed between the first side wall of the second channel and the circumferential wall in the radial direction, and the first arcuate exterior wall is adjacent to the first channel and the second channel;
a second arcuate exterior wall integrally formed with the second side wall being part of the first channel and the second side wall being part of the second channel, and the second angled wall is disposed between the second side wall of the second channel and the circumferential wall in the radial direction, and the second arcuate exterior wall adjacent to the first channel and the second channel;
at least two flow paths formed by the orientation of the rotor relative to the housing and the plurality of ports;
wherein the rotor is placed in one of a plurality of configurations relative to the ports and the housing such that each of the plurality of configurations includes the at least two flow paths.

10. The multi-port valve assembly of claim 9, wherein the first side wall being part of the first channel and the second side wall being part of the first channel are located at the angle relative to one another which is less than 90°.

11. The multi-port valve assembly of claim 9, wherein the first side wall being part of the first channel and the second side wall being part of the first channel are tangential to the circular aperture.

12. The multi-port valve assembly of claim 9, wherein the first side wall integrally formed as part of the second channel and the second side wall integrally formed as part of the second channel are integrally formed with circumferential wall.

13. The multi-port valve assembly of claim 9, wherein the first angled wall and the second angled wall are parallel to one another.

14. The multi-port valve assembly of claim 9, wherein both the first arcuate exterior wall and the second arcuate exterior wall have a circumferential length that is greater than the inner diameter of each of the plurality of ports.

15. The multi-port valve assembly of claim 9, wherein during at least one of the plurality of configurations, fluid flows between two of the plurality of ports through the first channel, and fluid flows between another two of the plurality of ports through the second channel.

16. The multi-port valve assembly of claim 9, further comprising a dispersion configuration where fluid flows into the second channel from a first of the plurality of ports, and into a second of the plurality of ports and a third of the plurality of ports.

\* \* \* \* \*